Jan. 3, 1950   R. W. POINTER   2,493,026
RESILIENT SUSPENSION FOR VEHICLES
Filed Dec. 3, 1945   3 Sheets-Sheet 1

INVENTOR
Robert W. Pointer
BY
Harold C. Cook
ATTORNEY

Jan. 3, 1950
R. W. POINTER
2,493,026
RESILIENT SUSPENSION FOR VEHICLES
Filed Dec. 3, 1945
3 Sheets-Sheet 2
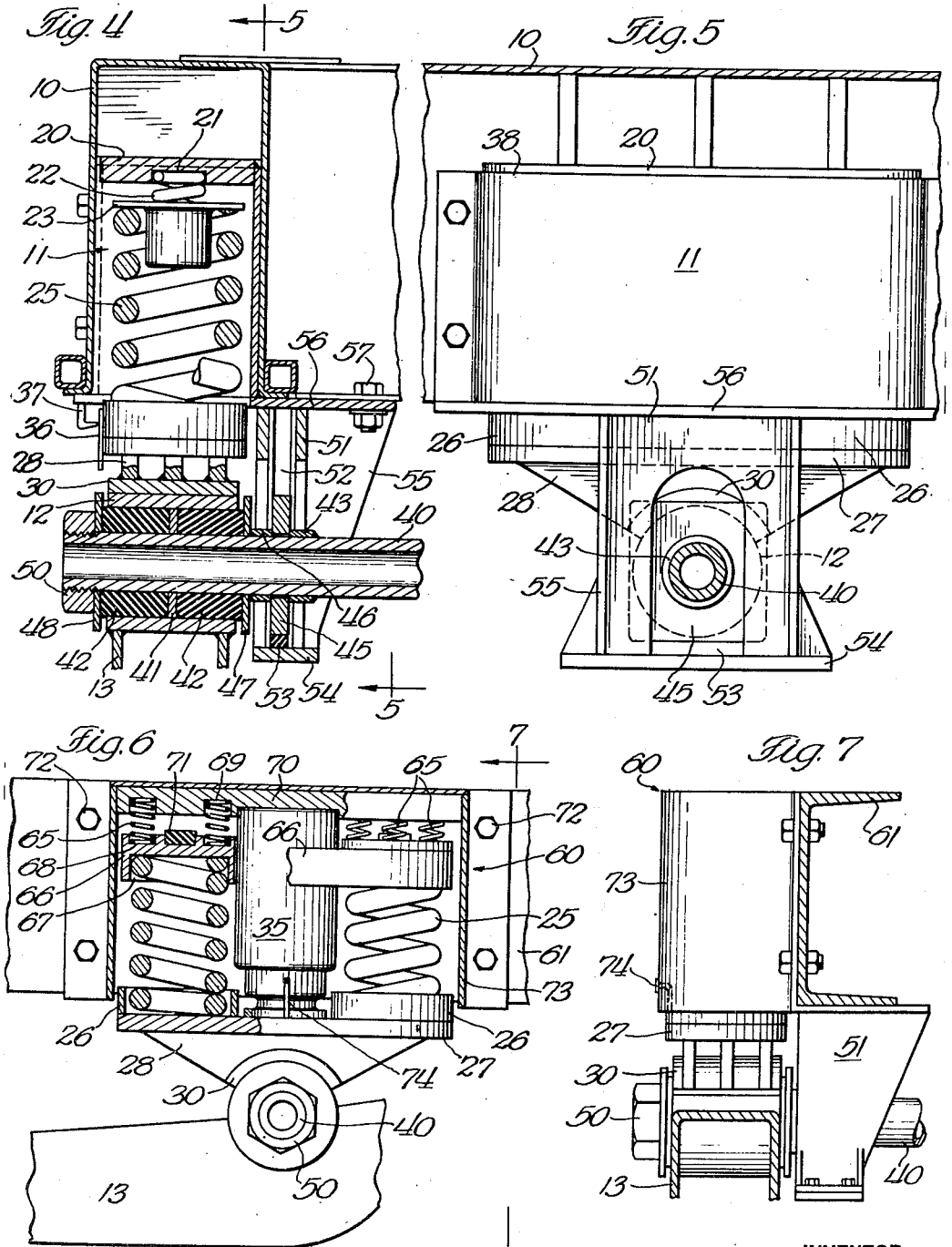
INVENTOR
Robert W. Pointer
BY
ATTORNEY

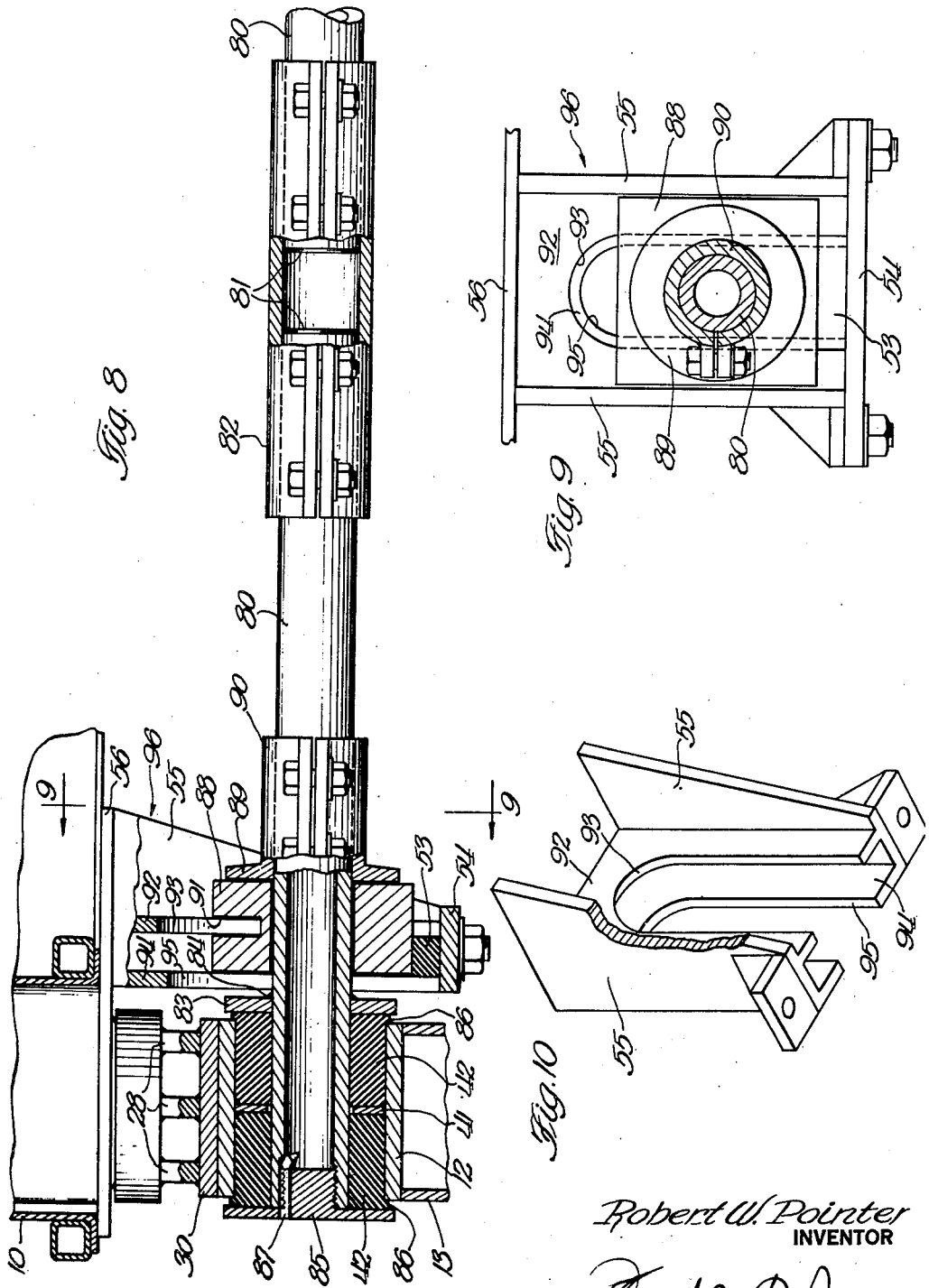

Patented Jan. 3, 1950

2,493,026

UNITED STATES PATENT OFFICE 2,493,026

RESILIENT SUSPENSION FOR VEHICLES

Robert W. Pointer, Portland, Oreg.

Application December 3, 1945, Serial No. 632,550

25 Claims. (Cl. 280—104.5)

This invention relates to improvements in vehicle suspension, having particular reference to resilient suspensions associated with axle carrying members such as walking beams and the like.

The general object of the invention is to provide a resilient vehicle suspension which is compact, economical to manufacture and maintain, and which has better riding qualities than conventional suspensions.

A further general object is to provide a coil spring suspension suitable for different types of walking beam arrangements on heavy vehicles such as trucks, full trailers, semi-trailers and the like.

A primary objective in the accomplishment of the above general objects is to provide a resilient suspension embodying spring assemblies having one or more coil springs to furnish the proper spring action in accordance with the weight of the load to be carried, the springs and wearing parts being easily removable and replaceable by ordinary mechanic's tools.

Another object is to provide a spring suspension so constructed and arranged that spring breakage will not disable the vehicle to the extent that it cannot continue to its destination or to a garage facility.

Another object is to provide a coil spring assembly having heavy coil springs for springing the vehicle when loaded, and light underload springs for springing the vehicle when empty or only slightly loaded, to impart improved riding qualities under all conditions of loading.

Another object is to provide a compact coil spring and shock absorber assembly which may be housed within a hollow frame member of the vehicle so as to provide support in the vertical plane of the frame member and at the same time allow the frame to ride low above the ground.

Another object is to provide a vehicle spring suspension which is free of lubrication and other periodic service requirements.

Another object is the provision of a coil spring assembly arranged to support a substantial part of the weight of the vehicle directly upon a trunnion on a walking beam or other axle carrying member.

Another object is to provide a spring assembly for supporting a vehicle frame member on a saddle bearing resting loosely on a walking beam trunnion wherein the spring assembly is provided with means for guiding the trunnion and walking beam for vertical movement without permitting separation of the parts.

Still another object is to provide a walking beam suspension having tubular trunnions for supporting a vehicle on coil spring assemblies and having a transverse trunnion shaft carrying no weight resiliently anchored in said trunnions on opposite sides of the vehicle to guide the walking beams in vertical and rocking movements.

These and other objects will become apparent as the description proceeds in connection with the accompanying drawings showing certain preferred embodiments of the invention. In each of these embodiments there is a walking beam suspension having tubular trunnions carrying saddle bearings for supporting a vehicle on coil spring and shock absorber assemblies. The walking beams on opposite sides of the vehicle are resiliently interconnected by a transverse trunnion guide shaft having its ends secured in rubber bushings in the trunnions. Vertical guide boxes associated with the spring assemblies and rigidly secured to the vehicle frame receive and guide the trunnion guide shaft for vertical movement and thereby maintain the trunnions and walking beams in their proper positions and alignment while at the same time accommodating spring action and rocking movements. The weight of the vehicle is transmitted through spring assemblies, saddle bearings, trunnions and walking beams all disposed in a vertical plane, and, when the vehicle construction will permit, these elements are positioned in the plane of the longitudinal frame members to reduce the stresses on the parts to a minimum and to provide exceptional resistance against side sway and other lateral forces acting on the vehicle under operating conditions.

The various elements of this construction may be modified to meet the requirements of different types of vehicles and to support loads of different weights. For instance, the trunnions may carry a single axle, they may carry independent walking beams having a pair of axles, or they may carry walking beams interconnected with other walking beams. Either one or two, or more, main load springs may be used having underload springs and one or more shock absorber mechanisms associated therewith. Also, the spring assemblies may be mounted on the vehicle in different ways. If the vehicle frame is of channel type, the spring assembly may be secured to the outside thereof in such a way as to provide a low suspension. If the vehicle frame is of inverted U type, the spring assemblies may be contained therewithin, so as to bring the walking beams directly beneath the frame members. The trunnion guide shaft may also take different forms, being either adjustable or non-adjustable, both as to length and as to the positioning of different associated parts thereon.

Other changes in the construction and arrangement may be resorted to, and it is to be understood that the invention includes all such modifications within the scope of the appended claims.

In the drawings:

Figure 4 is a transverse sectional view taken on the line 4—4 of Figure 2;

Figure 5 is a sectional view taken on the line 5—5 of Figure 4;

Figure 6 is a view corresponding to Figure 2 showing a modified spring assembly mounted on the outside of a channel type vehicle frame;

Figure 7 is a sectional view taken on the line 7—7 of Figure 6;

Figure 8 is a transverse sectional view showing a modified construction for the trunnion guide shaft and guide box;

Figure 9 is a sectional view, taken on the line 9—9 of Figure 8; and

Figure 10 is a view showing the guide box of Figures 8 and 9 in perspective.

Figure 1:
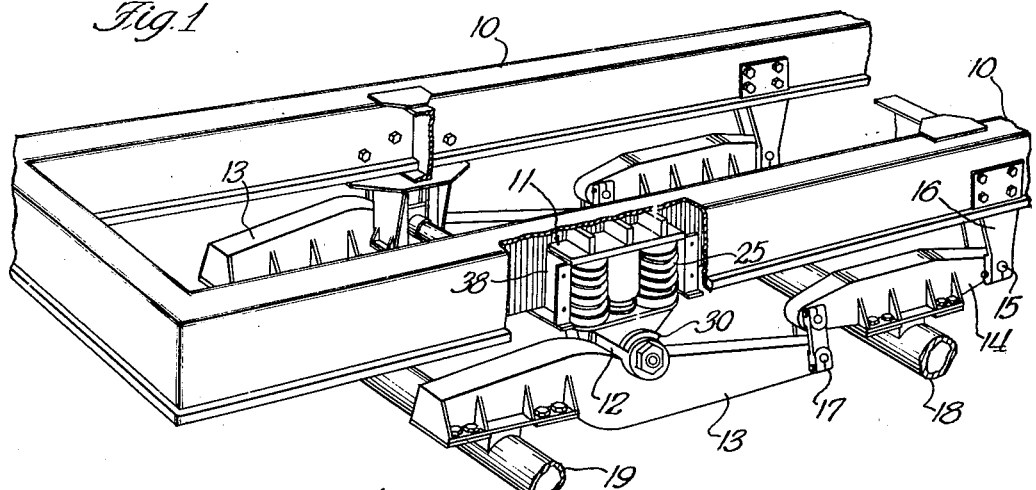
Figure 1 is a perspective view with parts broken away showing the present invention applied to a vehicle frame of inverted-U cross section having an interconnected dual beam dual axle type of suspension.

Referring first to the embodiment shown in Figures 1 to 5, the numeral 10 indicates longitudinal frame members of a vehicle, each of these members being of inverted-U shape in cross section. Within each frame member is a spring and shock absorber assembly, indicated generally at 11, supporting the frame upon a tubular trunnion 12 on a walking beam 13. The walking beam 13 in the present instance constitutes the rear beam of a dual beam suspension including also a front walking beam 14 having a pivotal connection at its front end with a bracket or hanger 16 on the frame member 10. The rear end of the front walking beam is pivotally connected with the front end of the rear walking beam by a shackle 17 or other means. The weight of the vehicle is thereby transmitted in vertical planes through the longitudinal frame members 10 on opposite sides of the vehicle to a pair of axles 18 and 19 carrying road wheels. The axles and walking beams in this suspension system are mounted and interconnected through resilient cushions and rubber bushings allowing a limited play of the parts in absorbing road shocks and negotiating curves.

The particular walking beam arrangement shown in Figure 1 is disclosed and claimed in my copending application for Beam suspension for vehicles, Serial No. 632,549, filed December 3, 1945.

Figure 2:
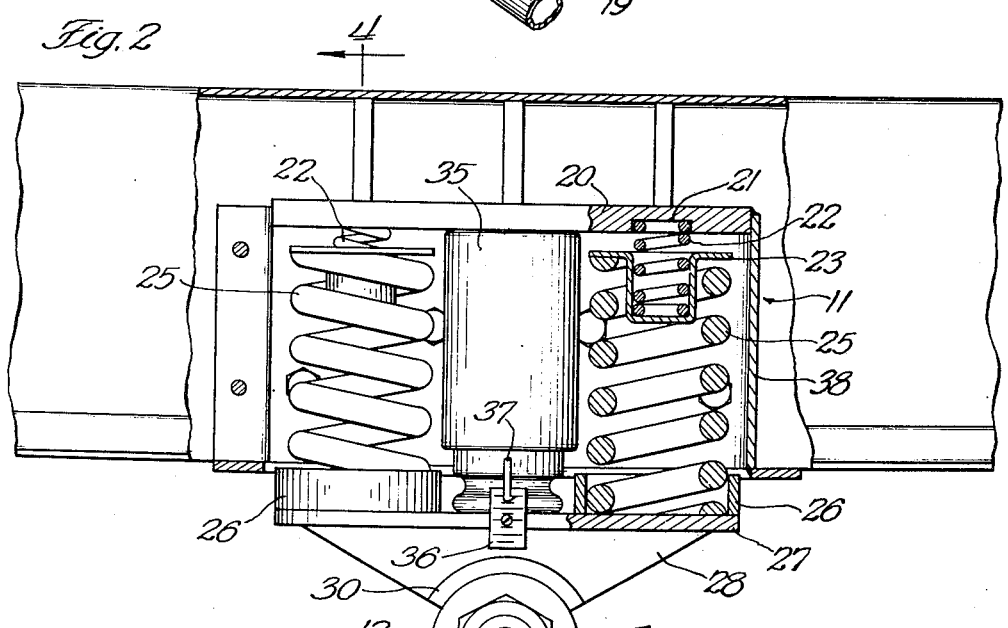
Figure 2 is an enlarged view in side elevation, with parts broken away, of the trunnion and spring assembly shown in Figure 1.
Figure 3:
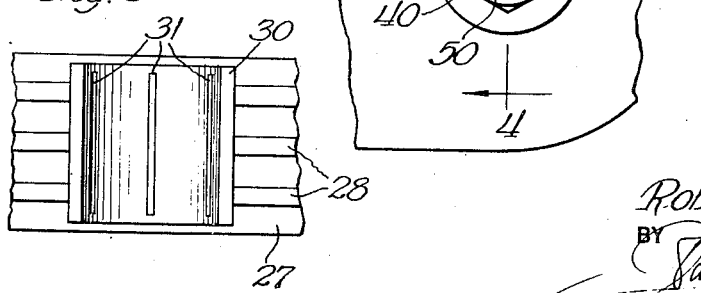
Figure 3 is a fragmentary bottom plan view of the saddle bearing and spring rider.

In each of the frame members 10 the weight of the vehicle is carried by a spring base plate 20 rigidly secured to the frame member and backed up by suitable webs or plates. As shown in Figures 2 and 4, the spring base plate 20 is provided with a pair of circular depressions or recesses 21 forming upper spring seats for underload springs 22 which are contained throughout most of their length in floating spring cups 23. Each of the spring cups 23 is flanged to bear upon the upper end of a main load carrying spring 25, the cups having sufficient depth to prevent the underload springs from becoming solid. The main springs 25 are seated in spring cups 26 on a spring rider plate 27. The spring rider plate 27 is made integral with a plurality of vertical webs 28 which are in turn made integral with a saddle bearing 30 resting loosely upon the trunnion 12. A plurality of leaded grooves 31, as shown in Figure 3, provide permanent greaseless lubrication for the saddle bearing and trunnion as the walking beam oscillates in the saddle. Such oscillation is permitted by making the saddle bearing of considerably less arcuate extent than the exposed bearing surface presented on the upper side of the trunnion.

In the present spring assembly there are two such main and underload spring combinations spaced apart on the spring rider plate 27 to allow space therebetween for a shock absorber or snubber unit 35 directly over the trunnion. This shock absorber is preferably of the friction type disclosed and claimed in the patent to Dath, No. 2,373,813, dated April 17, 1945, and is interposed between the spring rider plate 27 and the spring base plate 20 so as to control the action of both the main and the underload springs.

A scale of graduated markings 36 may be attached to the spring rider plate 27 so that a pointer 37 movable with the frame of the vehicle will indicate the weight of the load in tons. The spring assembly 11 is enclosed by a housing member 38 which is provided with a flange for bolting the assembly within the vehicle frame. The pointer 37 may be attached to the housing 38 or directly to the vehicle frame. This load indicator is claimed in my copending application for Vehicle load indicator, Serial No. 632,551, filed December 3, 1945.

The spring assembly just described provides for supporting the weight of the vehicle upon the trunnions 12 but does not provide means to prevent displacement of the trunnions 12 from their saddles, nor does it provide means for maintaining the general alignment and positioning of the walking beam 13 on the opposite sides of the frame. Additional structure for performing these functions will now be described with reference to Figures 4 and 5. The trunnions on opposite sides of the vehicle are resiliently interconnected by a trunnion guide shaft 40 which serves only as a guiding and spacing means and which carries no weight. Within each of the trunnions 12 is an integral annular wall or partition 41 which receives the trunnion shaft 40 and separates a pair of rubber trunnion bushings 42. Near each end of the trunnion shaft 40 is welded a collar 43, and carried loosely on the shaft adjacent thereto are a trunnion guide block 45, a spacing collar 46, and a washer 47, one against the other. The end of the shaft is provided with a washer 48 and a nut 50 whereby the whole assembly may be tightened securely against the collar 43. These parts are loose on the shaft in the sense that they are not attached and are freely removable by unscrewing the nut 50, but it is to be understood that the nut is tightened and locked in assembly to compress the rubber bushings and firmly maintain the parts in position.

Each of the spring assemblies 11 includes a guide box 51 integral with the housing 38 and extending downwardly beneath the vehicle frame. Each guide box 51 contains vertical channels for receiving and guiding the trunnion guide blocks 45 in vertical movement and removable bronze channel elements 52 preferably constitute the wearing surfaces in each channel. The lower end of each guide box is closed by a plate 54 carrying a rubber cushion element 53.

Each of the trunnions 12 is thereby permitted vertical movement in accordance with the height of the guide box, but the trunnions are maintained in the saddles 30 and in substantial alignment with each other through their resilient connections with the trunnion shaft 40. The compression of the trunnion bushings 42 by the nuts 50 resiliently maintains the guide block 45 snugly against the collar 43, and maintains a gripping engagement between the trunnion shaft and the trunnion bushings with the partition 41 maintaining the trunnion spaced midway between the washers 47 and 48 to prevent shifting of the trunnion on the shaft 40. For rigidity the trunnion guide box 51 is braced by gusset plates 55 and provided with a horizontal plate 56 bearing against the under side of the vehicle frame and providing means for additional attachment to cross members of the frame by bolts 57.

In this embodiment it will be seen that the weight of one side of the vehicle is transmitted in a vertical plane through the longitudinal frame member 10 to the walking beam 13, the spring and shock absorber assembly being housed entirely within the frame member itself to reduce the height of the member above the ground. This construction lends strength and stability to the suspension system, and makes it resistant to side sway which is especially objectionable in heavy vehicles. Both lateral and longitudinal movements of the trunnions are effectively prevented by the guide boxes, allowing the walking beams freedom for only vertical and oscillatory movements. In lieu of the beam arrangement shown in Figure 1 other beam arrangements as disclosed in copending applications hereinabove mentioned may be used with any embodiment of the present resilient suspension assembly. In the present double beam construction, vertical movement of either axle calls into play the spring action of one or both spring assemblies 11 which thereby serve both axles.

The springs and wearing parts are easily replaceable with ordinary mechanic's tools. By removing plates 54 from the bottom of the guide boxes and jacking up the vehicle frame the trunnion shaft will leave the guide boxes so that the saddle bearings and springs may be removed. By removing the nuts 50 from the ends of the trunnion guide shaft the latter may be withdrawn from the trunnions to free the guide blocks 45.

In the event of main spring breakage the spring base plate 20 carrying the frame 10 will settle a little lower on the spring rider plate 27 but the latter will thereby be confined within the housing 38 so that the saddle cannot become displaced from the trunnion. The vehicle can proceed on the reduced spring action afforded by the unbroken coils of the spring without having a breakdown on the road. If one of the underload springs 22 should break, the spring cup 23 would carry the vehicle on the base plate 20 just as it normally does when the vehicle is loaded.

An important feature of the spring assemblies is the arrangement of the underload springs 22 to spring the vehicle when empty. Certain kinds of vehicles, such as tank trucks and trailers, frequently travel in one direction fully loaded and return empty. Drivers have a tendency to overspeed with an empty truck, causing serious damage to tanks which are carried directly on stiff, heavy main springs. In the present spring assembly the empty vehicle is resiliently carried on the underload springs as shown in Figures 2 and 4 in such a manner that the main springs may be then considered as rigid members. The spring action of springs 22 is sufficiently soft to prevent bouncing and jolting from fast driving which would open up seams in the tank to cause leakage. When the vehicle is loaded the springs 22 are compressed so that the spring cups 23 are brought to bear directly against the spring base plate 20 to carry the load on the heavy springs 25.

Figures 6 and 7 disclose an embodiment having a modified spring assembly, indicated generally by the reference numeral 60, adapted to be bolted to the outside of a channel type vehicle frame. The vehicle frame is indicated by the numeral 61 carrying the spring assembly 60 on the outside thereof and the guide box 51 directly thereunderneath so as to support the lower flange of the channel. In this embodiment the construction of the trunnion, trunnion shaft and guide box are the same as in the embodiment just described, but an arrangement is shown for providing greater selectivity in obtaining a desired spring rate in the underload springs. It will be seen that the main springs 25 and the shock absorber 35 seat upon the spring rider plate 37 in the manner previously described, but that a plurality of underload springs 65 are grouped over each of the main load springs 25. This is accomplished by providing a floating spring plate 66 having large spring cups 67 on the under side for seating the upper ends of both main springs 25, and having small spring cups or seats 68 on the upper side for seating a cluster of underload springs 65 in a circle directly above each of the main springs. The upper spring base plate 70 is likewise provided with a plurality of spring seats 69 for the underload springs, and a cushion rubber or bumper 71 is provided either on the floating spring plate 66 or on the spring base plate 70 to transmit the load directly to the main spring without metal to metal contact after a predetermined compression of the underload springs has taken place and before they become solid. The number and size of the underload springs in each cluster may be varied to best satisfy the requirements of the vehicle on which the spring assembly is to be used.

The floating spring plate 66 has a central opening through which the shock absorber 35 passes to engage the spring base plate 70 and spring rider plate 27 for controlling the action of the entire assembly. In this embodiment the spring base plate 70 may be made an integral part of a rugged and substantial housing to be attached securely to the vehicle frame by means of a plurality of bolts 72, or the like. This frame or housing includes an outer member 73 provided with a weight scale associated with a pointer 74 on the spring rider plate 27.

The spring arrangement shown in Figures 6 and 7 possesses all the features and advantages discussed in connection with the first embodiment and may obviously be applied also to an inverted U frame either by attaching the housing to the outside of the frame member or by securing it within the frame member as in Figure 1. Likewise, the spring combination shown in Figure 2 may be used in Figures 6 and 7 on a channel frame.

Figure 8 shows a modification in which the trunnion guide shaft 80 is made in two pieces having inner ends 81 secured together under the center of the vehicle by a split clamp 82. In this construction the abutment for compression of the trunnion bushings 42 comprises a washer 83 welded to the trunnion shaft at 84 independently of the guide blocks. A flanged plug 85 is screwed into the outer end of the trunnion shaft to exert a compressive force on the bushings 42 to cause sufficient deformation to raise spacing flanges 86 slightly overlying the ends of the tubular trunnions 12. If desired, the flanges 86 may be preformed on the bushings to insure a separation between the ends of the trunnion tube 12 and the washer 83 and plug 85. These flanges, together with the central partition 41 in the trunnion tube are thereby effective in resiliently maintaining the trunnion tube in a relatively fixed position on the trunnion shaft 80 to insure the maintenance of proper alignment beneath the saddle bearing 30. Unscrewing of the plug 85 is prevented by a locking key 87.

This construction also employs a modified guide block 88 loosely received on the trunnion shaft and bearing against a flange 89 on a split clamp 90. The guide block 88 is square in shape and is provided with a slot 91 in its top and side edges adapted to receive opposed edge portions of a vertical plate 92 for relative sliding movement, the plate 92 being cut out in a vertical slot at 93 to receive the guide block, and the various clearances between the plate and the guide block being designed to produce a loose sliding fit. A second vertical plate 94 is spaced from the plate 92 to provide a bearing against a face of the guide block, and this plate is provided with a vertical slot 95 of a width to receive the trunnion shaft 80 to allow for its vertical movement therein. The vertical plates 92 and 94, together with the cushion rubber 53, bottom plate 54, side gusset plates 55, and the top supporting plate 56, constitute a guide box 96 very similar to the previously described guide box 51, the principal difference being that in the present guide box the bearing for the guide block is provided by the vertical plates directly so as to dispense with the removable wear channels 52. The guide box 96 is preferably made of steel and the block 88 of bronze, so that substantially all the wear takes place in the latter, which may be easily replaced.

The construction shown in Figure 8 possesses a number of advantages. By making the trunnion shaft in two pieces its installation and disassembly are facilitated. By providing for adjustments in installation, both in the over-all length of the trunnion shaft and in the locating of the guide block abutments, smoother operation of the mechanism is obtained with less wear on the parts. Thus the guide blocks 88 may be assembled on the trunnion shaft to exactly fit in the guide boxes on the opposite sides of the vehicle without the necessity for wearing in, which ultimately produces looseness of the parts.

Another advantage is that the length of the clamp 90 provides a better bearing on the trunnion shaft to resist stresses imposed by the guide blocks 88 when the shaft ends are at different heights in the guide boxes on opposite sides of the vehicle. Further, the compressive stresses exerted by the trunnion bushings 42 are not added to these stresses, but are confined to the ends of the shaft and are transferred thereto independently of the guide blocks. Through the use of a split shaft and independent abutments for the different sets of stresses, each guide block may be removed for replacement from the inner end 81 of the shaft without disturbing the mounting of the trunnion 12. This is accomplished by merely removing the bottom plate 54 on each guide box to allow the guide block to drop out, and then removing the clamp 90 and the coupling 82. In the event of emergency repairs in the absence of standard parts supplied by the original manufacturer, replacement guide blocks 88, for instance, could be made in any machine shop, and lack of precision in the making thereof could be largely compensated for in the adjustment of the clamps 90.

Having now described my invention and in what manner the same may be used, what I claim as new and desire to protect by Letters Patent is:

1. A spring assembly for a vehicle suspension comprising a spring base plate, a spring rider plate, a pair of helical main springs bearing against said spring rider plate, a floating spring plate carried by and bearing upon said main springs, a plurality of underload springs grouped around the axis of each main spring and interposed between said floating spring plate and said spring base plate, a resilient bumper between said last mentioned plates, and a friction shock absorber extending through said floating spring plate and bearing against said spring base and rider plates for controlling the combined spring action.

2. A spring assembly for a vehicle suspension comprising a spring housing, a resilient member in said housing for supporting said vehicle, a trunnion saddle seating said spring, a trunnion for supporting said saddle, an axle carrying member integral with said trunnion, a transverse trunnion shaft resiliently inter-connecting said trunnions on opposite sides of the vehicle, and guide means on said housing for guiding said trunnion shaft for limited vertical movement.

3. In a vehicle suspension, a pair of walking beams on opposite sides of the vehicle, a trunnion support on each of said walking beams, a transverse trunnion shaft carrying no weight resiliently interconnecting said trunnions on opposite sides of the vehicle, guide means for guiding said shaft for limited vertical movement, a saddle on each of said trunnions, and resilient members on said saddles for supporting said vehicle.

4. A vehicle suspension as defined in claim 3 wherein said trunnions have external weight carrying bearing surfaces and said trunnion shaft is mounted in resilient bushings in the trunnions.

5. A vehicle suspension as defined in claim 3 wherein said trunnions are of tubular shape having external bearing surfaces to support said saddles, and said trunnion shaft is mounted at its ends in said trunnions.

6. In a vehicle suspension, a pair of walking beams, one on each side of the vehicle, a trunnion on each of said walking beams, a transverse trunnion shaft extending between said trunnions, resilient means for connecting said trunnions with opposite ends of said shaft, stationary guide means surrounding said shaft adjacent each trunnion for guiding said shaft ends for limited vertical and rotational movements, and a pair of resilient assemblies independent of said trunnion shaft for supporting said vehicle directly on said trunnions.

7. In a vehicle suspension, a pair of walking beams, one on each side of the vehicle, a trunnion on each of said walking beams, a transverse trunnion shaft extending between said trunnions, resilient means for connecting said trunnions with opposite ends of said shaft, guide means for guiding said shaft ends for limited vertical movement, and a pair of spring assemblies for supporting said vehicle on said trunnions, each of said spring assemblies comprising a helical coil spring, a shock absorber, and a trunnion saddle, said trunnion saddle bearing upon said trunnion and seating said spring and shock absorber.

8. In a vehicle suspension, a pair of walking beams, one on each side of the vehicle, a hollow trunnion on each of said walking beams, a resilient bushing in each of said hollow trunnions, a transverse trunnion shaft having opposite ends secured in said bushings, guide means for guiding said shaft ends for limited vertical and rotational movements, and a pair of spring assemblies for supporting said vehicle directly on said trunnions independently of said trunnion shaft, each of said spring assemblies having a stationary housing part surrounding said trunnion shaft and constituting one of said guide means.

9. In a vehicle suspension, a pair of walking beams, one on each side of the vehicle, a hollow trunnion on each of said walking beams, a resilient bushing in each of said hollow trunnions, a transverse trunnion shaft having opposite ends secured in said bushings, resilient assemblies supporting said vehicle on said trunnions, a housing for each of said spring assemblies secured to said vehicle, a vertical guide box on each said housing, and means on said trunnion shaft ends slidable in said guide boxes to guide said trunnions for independent vertical movement.

10. In a vehicle suspension, a pair of tubular trunnions on opposite sides of the vehicle for transmitting a portion of the vehicle weight to road wheels, resilient bushings in said trunnions, a transverse trunnion shaft having its ends secured in said bushings, guide blocks on said shaft ends, guide boxes on said vehicle having vertical channels slidably receiving said guide blocks, trunnion saddles bearing on said trunnions, and resilient assemblies carried by said trunnion saddles for supporting said vehicle.

11. In a vehicle suspension, a pair of walking beams on opposite sides of said vehicle, a hollow tubular trunnion presenting a semi-cylindrical load bearing surface exposed on the upper side of each walking beam, saddle bearings resting upon said trunnions and allowing pivotal movement of said walking beams about their trunnion axes, spring assemblies carrying the weight of said vehicle on said saddle bearings, a pair of resilient tubular bushings in each trunnion, a transverse trunnion shaft having its ends secured in said bushings, an abutment within each trunnion between said bushings, means for clamping the ends of said trunnion shaft, a guide block on each trunnion shaft end, and guide boxes mounted rigidly on said vehicle and having vertical channels for slidably guiding said guide blocks.

12. In a vehicle suspension, a pair of axle carrying trunnions, one on each side of the vehicle, resilient bushings in said trunnions, spring assemblies for supporting said vehicle on said trunnions, vertical guide boxes associated with said spring assemblies, and a transverse trunnion shaft extending through said trunnions, said trunnion shaft having a rigid abutment near each end thereof, guide blocks on said shaft slidable in said guide boxes, washers on opposite sides of said resilient bushings, and means on the ends of said shaft for clamping said resilient bushings and said guide blocks against said abutments.

13. In a vehicle suspension, a pair of axle carrying trunnions, one on each side of the vehicle, spring assemblies for supporting said vehicle on said trunnions, vertical guide boxes associated with said spring assemblies, a transverse trunnion shaft extending between the trunnions on opposite sides of the vehicle, a pair of abutments of said shaft, a central abutment in each of said trunnions, resilient trunnion bushings on opposite sides of said trunnion abutments and surrounding said trunnion shaft, a guide block on said trunnion shaft slidable in said guide box, washers on said trunnion shaft on opposite ends of said trunnion bushings, and means on the ends of said shaft acting against one of said washers to clamp said trunnion bushings and said guide blocks firmly against said shaft abutments.

14. In a vehicle suspension, tubular axle carrying trunnions on opposite sides of the vehicle, spring assemblies supporting said vehicle on said trunnions, an annular abutment within each of said trunnions, resilient bushings in said trunnions on opposite sides of said abutments, a transverse trunnion guide shaft having its ends received in said bushings in the respective trunnions, and means for compressing said bushings on said shaft to maintain said trunnions in fixed positions.

15. In a vehicle suspension having a walking beam trunnion extending across the top surface of the beam, a spring rider and trunnion saddle comprising a spring rider plate, a coil spring seat on one side of said plate for receiving a spring supporting said vehicle, and an arcuate trunnion saddle bearing on the other side of said plate, said bearing having a limited arcuate extent to permit oscillation of said walking beam.

16. In a vehicle suspension having a walking beam trunnion, an elongated spring rider and trunnion saddle comprising a spring rider plate, a plurality of coil spring seats arranged longitudinally on one side of said plate, and an arcuate trunnion saddle bearing on the other side of said plate, said bearing having a limited arcuate extent to permit oscillation of said walking beam in the plane of said spring seats.

17. In a vehicle suspension, a walking beam having a trunnion on the top surface of the beam a coil spring assembly comprising a spring base plate mounted on said vehicle, a spring rider plate for supporting said vehicle on said walking beam trunnion, coil springs interposed between said two plates, and means for mounting said assembly in a vehicle frame member of inverted U shape with said walking beam vertically beneath said frame member.

18. In a vehicle suspension, a pair of axle carrying beams on opposite sides of the vehicle, tubular trunnions of limited arcuate extent on the top sides of said beams for supporting the vehicle directly thereon, a transverse trunnion shaft interconnecting the trunnions on opposite sides of the vehicle, and means on said shaft for adjusting the length thereof and for permitting separation of the two ends thereof.

19. In a vehicle suspension, walking beams on opposite sides of the vehicle, a tubular trunnion in each of said beams, resilient assemblies supporting the vehicle on said trunnions, a transverse trunnion shaft carrying no load resiliently mounted in said trunnions to interconnect said walking beams, guide boxes on said vehicle adjacent said trunnions receiving and guiding said trunnion shaft in vertical movement under the action of said resilient assemblies, and means for adjusting the length of said trunnion shaft between said guide boxes.

20. In a vehicle suspension, a pair of axle carrying beams on opposite sides of the vehicle, tubular trunnions in said beams adapted to support the vehicle thereon, resilient bushings in said trunnions, a transverse trunnion guide shaft mounted at its ends in said bushings, a pair of guide blocks loosely mounted on said shaft adjacent said beams, and separate abutments on said shaft for positioning said trunnion bushings and said guide blocks.

21. In a vehicle suspension, a pair of axle carrying beams on opposite sides of the vehicle, tubular trunnions in said beams for supporting the vehicle thereon, resilient bushings in said tubular trunnions, a transverse trunnion guide shaft mounted at its ends in said bushings, abutments on said shaft at the inner ends of said bushings, means on the ends of said shaft for compressing said bushings against said abutments, guide blocks loosely mounted on said shafts, adjustable abutment clamps for said guide blocks on said shaft, and means in the center of said shaft for adjusting the over-all length of said shaft and for permitting the separation of the two ends thereof.

22. In a vehicle suspension, an axle carrying beam, a hollow tubular trunnion on said beam, resilient bushings in said trunnion tube, a trunnion shaft end mounted in said bushings, an abutment washer fixed on said shaft at the inner end of said bushings, means on the end of said shaft for compressing said bushings against said abutment washer, a vertical guide box on the vehicle for receiving the end of said shaft adjacent said beam, a pair of vertical wall members in said guide box disposed at right angles to said shaft, vertical slots in said wall members to allow vertical movements of said shaft in said guide box, a guide block loosely mounted on said shaft, said guide block having one face bearing against one of said wall members and having a slot receiving and bearing against the other of said wall members, and a clamp on said shaft providing an abutment for said guide block to determine the lateral position of said shaft and said beam with respect to the vehicle.

23. In a vehicle suspension, walking beams on opposite sides of the vehicle, a tubular trunnion in each of said beams, resilient assemblies supporting the vehicle frame on said trunnions, resilient bushings in said trunnions, a half trunnion shaft carrying no load mounted in said bushings in each of said trunnions, an adjusting sleeve rigidly connecting inner ends of said two half shafts to form an adjustable length trunnion shaft interconnecting said walking beams, guide boxes on said vehicle adjacent said trunnions, guide blocks on said trunnion shaft vertically slidable in said guide boxes under the action of said resilient assemblies, and a pair of trunnion guide block abutments on said trunnion shaft engaging said guide blocks to position said shaft and said beams with respect to the frame of the vehicle.

24. In a vehicle suspension, a walking beam, a tubular trunnion in said beam, a resilient assembly supporting the vehicle frame on said trunnion, a resilient bushing in said trunnion, a vertical guide box on the vehicle frame adjacent said trunnion, a trunnion guide shaft carrying no weight mounted in said trunnion bushing and extending through said guide box, a pair of spaced parallel vertical guide plates in said guide box, a guide block on said shaft having a portion disposed between said guide plates and portions disposed on opposite sides of one of said guide plates and vertically slidable thereon, and a trunnion guide block abutment adjustably secured on said shaft substantially in engagement with said guide block.

25. A suspension for vehicles having hollow longitudinal frame members, comprising a resilient assembly mounted in one of said frame members, an axle carrying beam disposed in the vertical plane of said frame member, a trunnion extending across said beam and supporting said frame member on said resilient assembly, said resilient assembly bearing directly on said trunnion and a trunnion guide shaft having only rotational and vertical movements resiliently mounted in said trunnion and free of the load on said trunnion.

ROBERT W. POINTER.

REFERENCES CITED

The following references are of record in the file of this patent:

UNITED STATES PATENTS

| Number | Name | Date |
|---|---|---|
| 655,738 | Robinson | Aug. 14, 1900 |
| 713,135 | Murdock | Nov. 11, 1902 |
| 1,638,230 | Alsaker | Aug. 9, 1927 |
| 1,825,093 | Sansburn | Sept. 29, 1931 |
| 1,941,768 | Vigne | Jan. 2, 1934 |
| 1,985,369 | Fuchs | Dec. 25, 1934 |
| 1,985,414 | Judd | Dec. 25, 1934 |
| 2,103,381 | Perkins et al. | Dec. 28, 1937 |
| 2,193,567 | Pointer | Mar. 12, 1940 |
| 2,237,575 | Quartullo | Apr. 8, 1941 |
| 2,354,458 | Hammerstrom | July 25, 1944 |